United States Patent
Lee et al.

(10) Patent No.: US 12,074,537 B2
(45) Date of Patent: Aug. 27, 2024

(54) MULTIDIMENSIONAL SPACE VECTOR MODULATION (MDSVM) CIRCUIT AND METHOD THEREOF

(71) Applicant: TENSOR TECH CO., LTD, New Taipei (TW)

(72) Inventors: Shang Jung Lee, Chiayi (TW); Po-Hsun Yen, Chiayi (TW); Yung-Cheng Chang, Chiayi (TW); Sung-Liang Hou, Chiayi (TW)

(73) Assignee: TENSOR TECH CO., LTD., New Taipei (TW)

( * ) Notice: Subject to any disclaimer, the term of this patent is extended or adjusted under 35 U.S.C. 154(b) by 0 days.

(21) Appl. No.: 18/133,295

(22) Filed: Apr. 11, 2023

(65) Prior Publication Data

US 2024/0136946 A1 Apr. 25, 2024
US 2024/0235420 A9 Jul. 11, 2024

(30) Foreign Application Priority Data

Oct. 19, 2022 (TW) .................................. 111139657

(51) Int. Cl.
*H02M 7/487* (2007.01)
*H02M 7/5387* (2007.01)

(52) U.S. Cl.
CPC ......... *H02M 7/487* (2013.01); *H02M 7/5387* (2013.01)

(58) Field of Classification Search
CPC ............................ H02M 7/487; H02M 7/5387
See application file for complete search history.

(56) References Cited

U.S. PATENT DOCUMENTS

| | | | | |
|---|---|---|---|---|
| 4,126,819 A * | 11/1978 | Stobbe | ................. | H02M 1/092 318/810 |
| 4,635,177 A * | 1/1987 | Shekhawat | ........... | H02M 7/797 363/41 |
| 5,852,558 A * | 12/1998 | Julian | ..................... | H02M 1/12 363/41 |
| 9,240,738 B2 * | 1/2016 | Hsieh | ..................... | H02M 1/32 |
| 2007/0247123 A1 * | 10/2007 | Bocchiola | ........... | H02M 7/5387 323/222 |
| 2008/0049460 A1 * | 2/2008 | Mohan | ................. | H02M 5/271 363/34 |
| 2008/0239775 A1 * | 10/2008 | Oughton | ............. | H02M 1/0043 363/134 |
| 2012/0205982 A1 * | 8/2012 | Navarro | ................. | H02J 9/062 307/66 |

(Continued)

*Primary Examiner* — Yusef A Ahmed
(74) *Attorney, Agent, or Firm* — Millen, White, Zelano & Branigan P.C.; Wan-Ching Montfort

(57) ABSTRACT

This patent presents a multidimensional space vector modulation (MDSVM) circuit formed by coupling a half-bridge logic control circuit not directly coupled to electronic components with at least three half-bridge logic control circuits coupled to electronic components. The half-bridge logic control circuit not directly coupled with any electronic components can form a full-bridge circuit with any other half-bridge logic control circuit coupled with electronic components. Therefore, users can further control the voltage difference between both ends of each electronic component separately and then individually control the strength and direction of current flowing through each electronic component and solving the problem of control attributed to the complexity of prior art.

10 Claims, 3 Drawing Sheets

(56) References Cited

U.S. PATENT DOCUMENTS

| | | | | |
|---|---|---|---|---|
| 2014/0268933 A1* | 9/2014 | Zhou | ............. | H02M 1/12 |
| | | | | 363/44 |
| 2015/0155796 A1* | 6/2015 | Hsieh | ............. | H02M 1/32 |
| | | | | 363/131 |
| 2018/0041155 A1* | 2/2018 | Blackwelder | ............. | H02P 23/04 |
| 2018/0131295 A1* | 5/2018 | Sun | ............. | H02P 23/0004 |
| 2018/0131299 A1* | 5/2018 | Sun | ............. | H03B 5/24 |
| 2019/0334457 A1* | 10/2019 | Jeng | ............. | H02M 7/5395 |
| 2019/0379271 A1* | 12/2019 | Chen | ............. | H02M 1/08 |
| 2020/0204081 A1* | 6/2020 | Backman | ............. | H02M 3/158 |
| 2021/0058003 A1* | 2/2021 | Ni | ............. | H02M 5/4585 |
| 2021/0218342 A1* | 7/2021 | Zmood | ............. | H02M 7/5387 |
| 2022/0045599 A1* | 2/2022 | Won | ............. | H02M 7/53876 |
| 2022/0045601 A1* | 2/2022 | Won | ............. | H02M 1/325 |
| 2022/0200479 A1* | 6/2022 | Ni | ............. | H02M 7/483 |
| 2022/0329184 A1* | 10/2022 | Lian | ............. | H02M 7/219 |
| 2023/0105607 A1* | 4/2023 | Hanioka | ............. | H02M 7/5387 |
| | | | | 318/504 |

\* cited by examiner

MULTIDIMENSIONAL SPACE VECTOR MODULATION (MDSVM) CIRCUIT AND METHOD THEREOF

CROSS-REFERENCE TO RELATED PATENT APPLICATION

This application claims the benefit under 35 USC § 119 of Taiwan Patent Application No. 111139657 filed on Oct. 19, 2022, which is incorporated herein by reference in its entirety.

FIELD OF THE DISCLOSURE

The present disclosure relates to a space vector modulation circuit and method, particularly a multidimensional space vector modulation circuit and method.

BACKGROUND

In order to generate magnetic fields with different directions and strengths, it needs not only a plurality of magnetic field generation coils with different strengths but also to individually control the switch of each coil and the current intensity through each coil.

To generate an alternating current with controllable amplitude, frequency, and phase on the coil requires a control signal provided by a set of full-bridge (or a half-bridge) circuits as well as a pulse-width modulation (Pulse-width modulation, PWM)/pulse frequency modulation (pulse frequency modulation, PFM). Both the full-bridge circuit and the half-bridge circuit have the function of switching the intensity and direction of the current. From the perspective of controllability and accuracy, the full-bridge circuit might be better than the half-bridge circuit. The intensity and direction of the current on the modulation target are easily affected by other electrical loads in the half-bridge circuit; therefore, it is not easy to individually control the intensity and direction of the current on the modulation target. On the other hand, the intensity and direction of the current on the modulation target are not easily affected by other electrical loads in the half-bridge circuit, and the intensity and direction of the current on the modulation target can be individually controlled in the full-bridge circuit. However, the half-bridge circuit has an advantage in saving the number of switches used. To control one magnetic field-generating coil, a set of the half-bridge circuit requires two switches, while a set of the full-bridge circuit requires four switches. It requires 4 N switches in a full-bridge circuit to control N magnetic field generating coils, which is more than in a half-bridge circuit of 2 N+2 when N is larger than 2, and it is more complicated in control.

SUMMARY

One embodiment of the present disclosure provides a multidimensional space vector modulation circuit (hereinafter referred to as an "MDSVM circuit"). The inventor utilizes the characteristics of the full-bridge circuit in combination with the novel configuration of the present disclosure to achieve the centralized management of multidimensional electronic components, which saves the number of switches used and solves the problem of relatively complicated control in the prior art. The scope of application of the MDSVM circuit of the present disclosure is not limited to the modulation of passive loads that can generate a magnetic field, such as inductors. The circuit can also be applied to other passive loads requiring voltage modulation, such as resistors, capacitors, etc. In addition, the MDSVM circuit of the present disclosure can also be used to modulate the voltage of the active loads, such as power supplies.

In some embodiments of the present disclosure, the MDSVM circuit includes N electronic components and N+1 logic control circuits coupled in parallel. N is a positive integer not less than 3, and the electronic components are coupled to each other to form a neutral point. Each of the logic control circuits has at least two switches coupled in series; each of the electronic components is individually coupled between the two switches of the logic control circuits, and the neutral point couples to one of the logic control circuits. In particular, between the neutral point and the logic control circuit, no electronic components are connected.

In some embodiments, the MDSVM circuit is a full-bridge circuit.

In some embodiments, the electronic components have coils, and when current flows through the coils, each of the electronic components generates a magnetic field.

In some embodiments, each of the logic control circuits has an even number of switches.

In some embodiments, the total number of switches in the MDSVM circuit is 2 N+2.

In some embodiments, each of the switches has Metal-Oxide-Semiconductor-Field-Effect Transistors (MOSFET), Insulated Gate Bipolar Transistors (IGBT), or Bipolar Junction Transistors (BJT).

In some embodiments, N is three (N=3), and the magnetic fields generated by each of the electronic components are perpendicular to each other.

Another embodiment of the present disclosure provides a multidimensional space vector modulation system (hereinafter referred to as an "MDSVM system"), which includes at least one circuit carrier with the aforesaid MDSVM circuit in any of the foregoing embodiments, a power supply, and a controller. The power supply is coupled to the circuit carrier and thereby coupled to the MDSVM circuit. The controller coupled to the circuit carrier and thereby coupled to the MDSVM circuit is configured to transmit electronic signals to the logic control circuits for controlling the states of the switches, thereby controlling the voltage difference between both ends of each of the electronic components.

Another embodiment of the present disclosure provides a multidimensional space vector modulation method (hereinafter referred to as an "MDSVM method"), including: coupling a plurality of half-bridge circuits to each other to form at least three full-bridge circuits, wherein there is at least one half-bridge circuit not coupled to any electronic component and at least three half-bridge circuits coupled to at least one electronic component; and individually control the strength and direction of current flowing through each of the electronic components.

In summary, the MDSVM circuit in accordance with the preferred embodiments includes at least three half-bridge logic control circuits coupled to at least three electronic components, and an extra half-bridge η-logic control circuit that is not directly coupled to the at least three electronic components but is coupled to the at least three half-bridge logic control circuits. In the MDSVM circuit, the η-logic control circuit and any one of the at least three other half-bridge logic control circuits coupled to electronic components form a full-bridge circuit. Users can individually control the voltage state of each electronic component by the MDSVM circuit of the present disclosure, thereby saving the number of switches used.

BRIEF DESCRIPTION OF THE DRAWINGS

The present disclosure will become more fully understood from the following detailed description when read with the and accompanying figures. It is noted that, in accordance with the standard practice in the industry, various features are not drawn to scale. In fact, the dimensions of the various feature may be arbitrarily increased or reduced for clarity of discussion.

DETAILED DESCRIPTION

Figure 1:
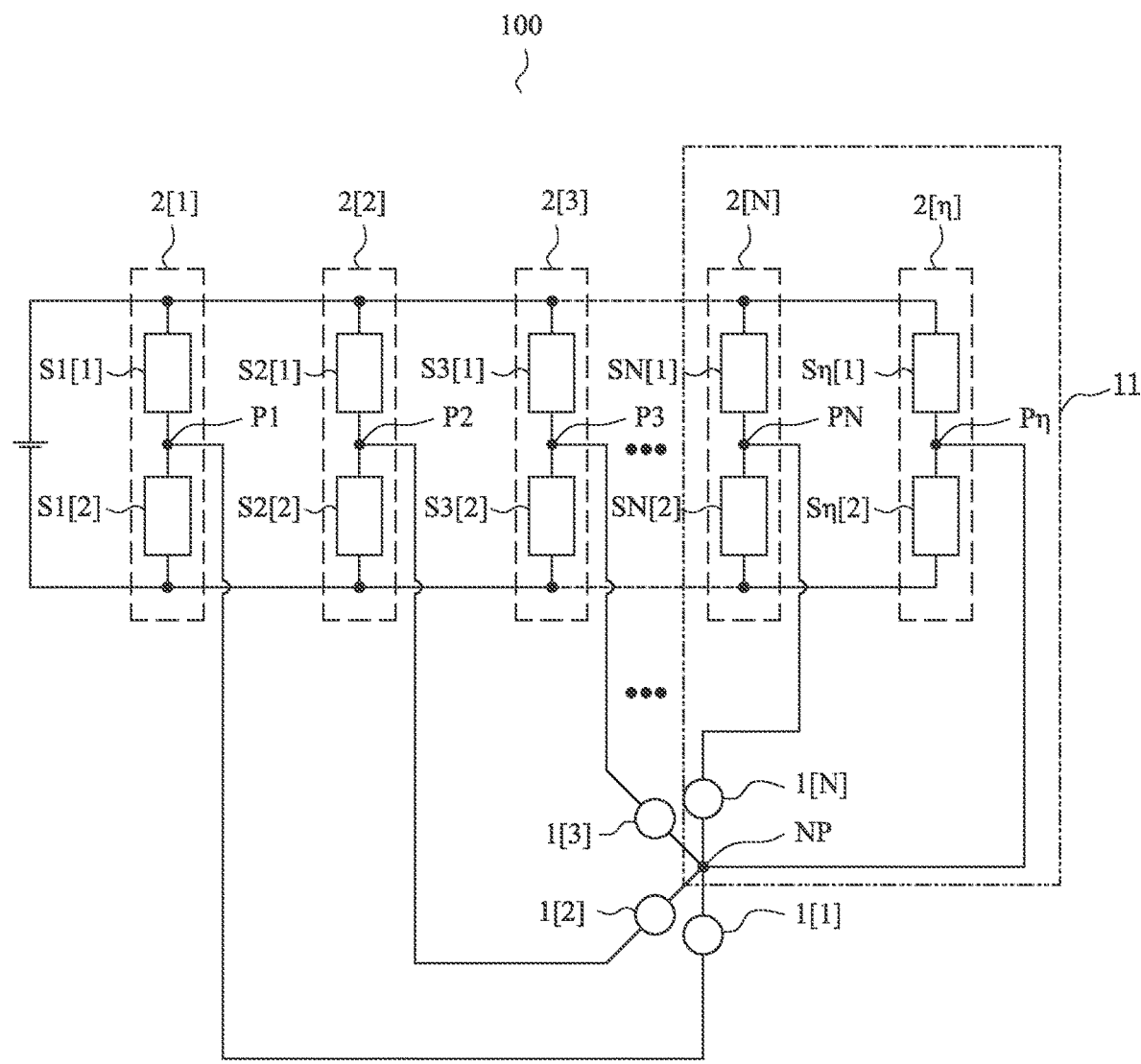
FIG. 1 is a schematic diagram illustrating a multidimensional space vector modulation (MDSVM) circuit in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which an additional feature, such that the first and second features may not be in-direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in the specification generally have their ordinary meanings in the art and in the specific context where each term is used. The use of examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, and, similarly, a second element could be termed a first element, without departing from the scope of the embodiments. As used herein, the term "and/or" includes any and all combinations of one or more of the associated listed items.

It should be noted that the directional indications (such as front, rear, left, right, above, under, clockwise, counterclockwise, etc.) in the embodiments are only used to describe the relative positions or movements, etc. of multiple components under specific circumstances (such as those shown in the drawings). When the circumstances are changed, the directional indications may be changed accordingly.

FIG. 1 is a schematic diagram illustrating a multidimensional space vector modulation circuit 100 (MDSVM circuit 100) in accordance with various embodiments of the present disclosure. In embodiments illustratively shown in FIG. 1, MDSVM circuit 100 includes N electronic components 1[1], 1[2], 1[3], and 1[N] (e.g., N=3), and N logic control circuits 2[1], 2[2], 2[3]~2[N], and at least one extra logic control circuit 2[η]. In other words, there are at least N+1 logic control circuits in total, comprising logic control circuits 2[1], 2[2], 2[3], 2[N], and 2[η]. For brevity, N electronic components 1[1], 1[2], 1[3], and 1[N] are collectively known as electronic components 1[1]~1[N] and logic control circuits 2[1], 2[2], 2[3], and 2[N] are collectively known as logic control circuits 2[1]~2[N].

In some embodiments, electronic components 1[1]~1[N] may be passive loads or active loads. In particular, the electronic components 1[1]~1[N] may be inductors, capacitors, resistors, and other passive loads, or other active loads having inductors, a coil winding, or a group of circuits with coil windings. In the embodiments, electronic components 1[1]~1[N] in active loads form, the electronic component will generate a magnetic field due to the principle of current magnetic effect when an electric current flows through the electronic components 1[1]~1[N].

In some embodiments, the logic control circuits 2[1]~2[N] refer to the circuits that control the direction of the voltage. Logic control circuits 2[1]~2[N] are in the form of half-bridge, and each of the logic control circuits 2[1]~2[N] has at least two switches. Furthermore, the first logic control circuit 2[1] is configured to control the voltage across an electronic component 1[1]. The second logic control circuit 2[2] is configured to control the voltage across an electronic component 1[2]. The third logic control circuit 2[3] is configured to control the voltage across an electronic component 1[3]. The Nth logic control circuit 2[N] is configured to control the voltage across an electronic component 1[N].

As shown in FIG. 1, each of logic control circuits 2[1]~2[N] has at least two switches coupled in series, and the logic control circuit 2[η] also has at least two switches coupled in series. The first logic control circuit 2[1] has switches S1[1], S1[2]. The second logic control circuit 2[2] has switches S2[1], S2[2]. The third logic control circuit 2[3] has switches S3[1], S3[2]. The Nth logic control circuit 2[N] has switches SN[1] and SN[2]. The logic control circuit 2[η] has switches Sη[1], Sη[2]. In some embodiments, each of logic control circuits 2[1]~2[N] has an even number of switches coupled in series, e.g., 2, 4, or 6. On the other hand, the logic control circuit 2[η] also has an even number of switches coupled in series, e.g., 2, 4, or 6. In some embodiments, the logic control circuit 2[η] is identical to each of logic control circuits 2[1]~2[N]. The number of switches of each of logic control circuits 2[1]~2[N] is equal to the number of switches of the logic control circuit 2[η]. Therefore, the total number of logic control circuits is N+1, and the total number of the switches of logic control circuits is 2 N+2.

One of the ends of the electronic components 1[1]~1[N] is coupled to form a neutral point NP. The other end of the electronic component 1[1] is coupled to an endpoint P1 between the switches S1[1]~S1[2]. The other end of the electronic component 1[2] is coupled to an endpoint P2 between the switches S2[1]~S2[2]. The other end of the electronic component 1[3] is coupled to an endpoint P3 between the switches S3[1]~S3[2]. The other end of the electronic component 1[N] is coupled to endpoint PN between the switches SN[1]~SN[2]. The coupling form of the electronic component 1[1], switches S1[1], S1[2], is commonly known as the totem pole. The coupling form of the electronic component 1[2], switches S2[1], S2[2], is also commonly known as the totem pole. In some embodiments, the method for calculating the number of electronic components in the present disclosure depends on the number of applications. All electronic components in the same phase are calculated as one electronic component. In other words, no matter how many electronic components between endpoint P1 (or P2, P3, PN) and neutral point NP, the number of electronic components is "one" because all the electronic components between endpoint P1 (or P2, P3, PN) and neutral point NP is in the same phase.

In some embodiments, the switches S1[1]~S1[2], S2[1]~S2[2], S3[1]~S3[2], and SN[1]~SN[2] are configured to open circuits, interrupt current, or make current flow to other circuits, for example, but not limited to capacitive touch switch, resistive switch, piezoelectric switch, photo-interrupter switch, magnetic reed switch, Hall switch or transistor, etc. In some embodiments, the logic control circuit uses a metal oxide semiconductor field effect transistor (MOSFET), insulated gate bipolar transistor (IGBT), or bipolar junction transistor (BJT) as a switch.

Figure 2:
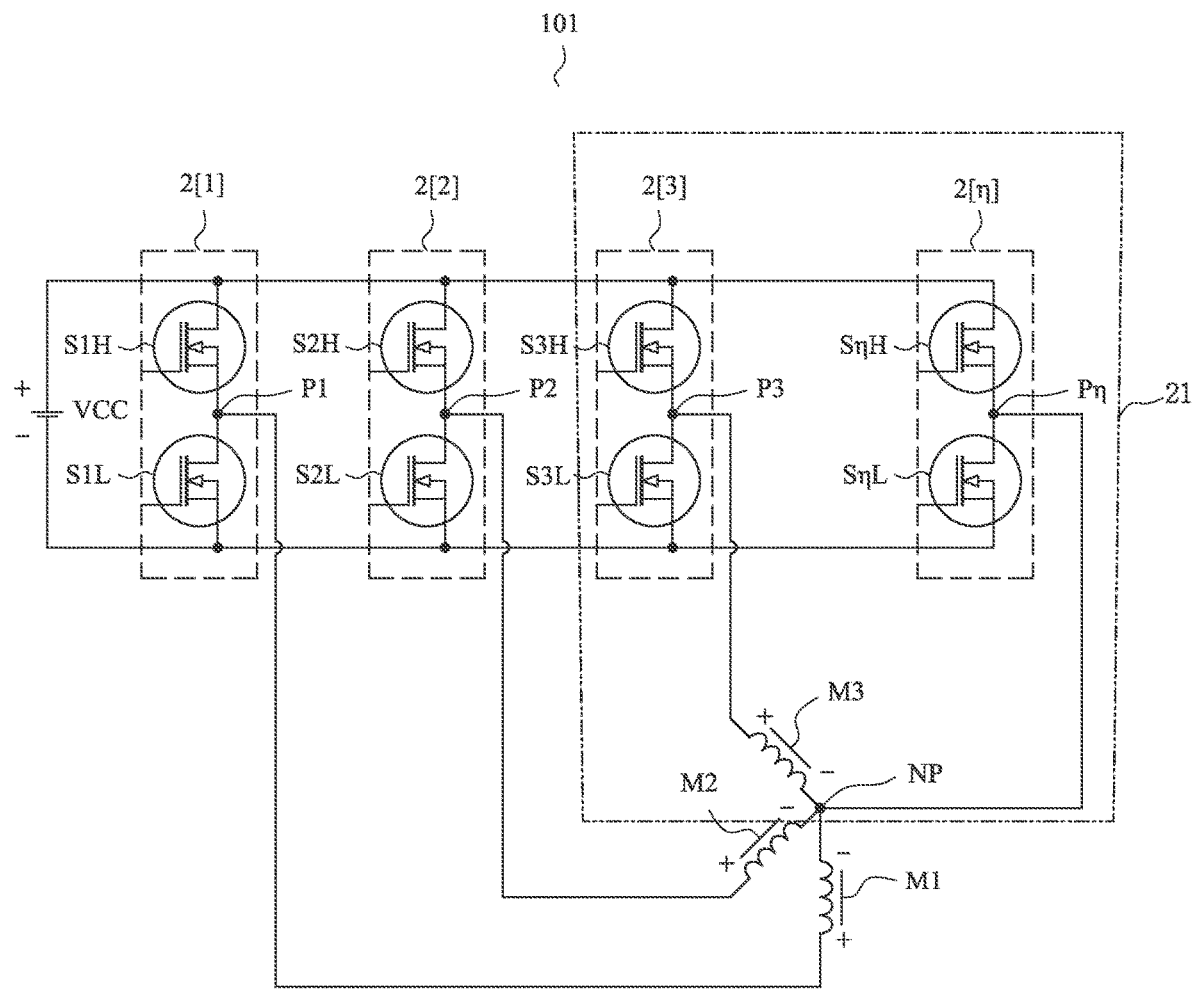
FIG. 2 is a schematic diagram illustrating a MDSVM circuit in accordance with some embodiments with three electronic components (N=3).

The neutral point NP is coupled to endpoint Pη between the switches Sη[1]~Sη[2]. No electronic component is coupled between the endpoint Pη and the neutral point NP. In other words, no electronic component is coupled between the neutral point NP and the logic control circuit 2[η]. The logic control circuit 2[η] can form a full-bridge circuit with any one of the logic control circuits 2[1]~2[N]; therefore, the voltage state across both ends of each of electronic components 1[1]~1[N] can be individually controlled. The voltage state of the endpoint Pη could be positive, negative, or zero voltage compared to each of endpoints P1, P2, P3, and PN according to user needs and instructions so that the direction of current between the endpoint Pη and each of the endpoints P1, P2, P3, and PN could be individually controlled. For example, the logic control circuit 2[1] and the logic control circuit 2[η] form a full-bridge circuit to control the voltage state of the electronic component 1[1], and the logic control circuit 2[2] and the logic control circuit 2[η] also form a full-bridge circuit to control the voltage state of the electronic component 1[2]. In the same manner, the logic control circuit 2[3], and the logic control circuit 2[η] form a full-bridge circuit, such as full-bridge circuit 11, to control the voltage state of the electronic component 1[3]. For the purpose of simplification, FIGS. 1-3 only mark one full-bridge circuit 11, 21. However, as described above and shown in the figures, there are at least three full-bridge circuits in the MDSVM 100 (FIG. 1,) 101 (FIG. 2). Based on such a structure, MDSVMs 100 and 101 shown in FIGS. 1-3 may also be considered in a form of a full-bridge circuit. Therefore, the user can individually control the voltage across the electronic component 1[1], 1[2], and 1[3]. However, in some embodiments, there may have an extra electronic component(s) between neutral point NP and endpoint P1 (or P2, P3, PN) under the premise of not affecting the convenience and accuracy of control of other loads' voltage state.

FIG. 2 is a schematic diagram illustrating an alternative multidimensional space vector modulation circuit 101 (MDSVM circuit 101) in accordance with the preferred embodiments of FIG. 1, in which N is three (N=3). The MDSVM circuit 101 is one example of many implementations. As shown in FIG. 2, MDSVM circuit 101 includes three magnetic field generating units M1, M2, and M3, three logic control circuits 2[1], 2[2], and 2[3], and one extra logic control circuit 2[η]. The magnetic field generating units M1, M2, and M3, respectively and sequentially corresponded to the electronic components 1[1], 1[2], and 1[3] in FIG. 1. In other words, there are four logic control circuits in total, comprising logic control circuits 2[1], 2[2], 2[3], and 2[η]. The multidimensional space vector modulation circuit 101 is one example of many implementations. For brevity, the magnetic field generating units M1, M2, and M3 are collectively known as magnetic field generating units M1~M3, and logic control circuits 2[1], 2[2], and 2[3] are collectively known as logic control circuits 2[1]~2[3].

Although the inductance symbols in FIG. 2 are used to indicate the magnetic field generating units M1~M3 that correspond respectively to electronic components 1[1]~1[3], it does not mean that magnetic field generating units M1~M3 must have inductance. In this embodiment, users can generate magnetic fields in three dimensions, for example, but not limited to three magnetic fields perpendicular to each other, using the magnetic field generation units M1~M3 in the MDSVM circuit 101. Because the MDSVM circuit 101 is a full-bridge circuit, the average voltage and average current intensity of each of magnetic field generation unit M1~M3 of MDSVM circuit 101 can be individually controlled. The magnetic fields with different strengths and various directions can be generated by mixing and superimposing the three-directional magnetic fields so that the MDSVM circuit 101 is especially suitable for being applying to multi-degree-of-freedom (Multiple DOFs) ball-type motor, such as the motor disclosed in the Taiwan Patent No. I719585.

In this embodiment, MDSVM circuit 101 includes magnetic field generation unit M1~M3 and logic control circuits 2[1]~2[3], and 2[η]. Each of logic control circuits 2[1]~2[3], and 2[η] has two switches coupled in series. The first logic control circuit 2[1] has switches S1H and S1L coupled in series. The second logic control circuit 2[2] has switches S2H and S2L coupled in series. The third logic control circuit 2[3] has switches S3H and S3L coupled in series. The logic control circuit 2η has switches SηH and SηL coupled in series.

In this embodiment, one end of each of the magnetic field generating units M1~M3 is coupled together to form a neutral point NP. The other end of the first magnetic field generating unit M1 is coupled to an endpoint P1 between the switches S1H~S1L. The other end of the second magnetic field generating unit M2 is coupled to an endpoint P2 between the switches S2H and S2L. The other end of the third magnetic field generating unit M3 is coupled to an endpoint P3 between the switches S3H-S3L.

In order to explain this embodiment more clearly, the switching table below is illustrated.

| | Input | | | | | | | | Output | | |
|---|---|---|---|---|---|---|---|---|---|---|---|
| | ηH | ηL | 1H | 1L | 2H | 2L | 3H | 3L | Phase 1 voltage | Phase 2 voltage | Phase 3 voltage |
| 1 | 0 | 1 | 0 | 1 | 0 | 1 | 0 | 1 | 0 | 0 | 0 |
| 2 | 0 | 1 | 0 | 1 | 0 | 1 | 1 | 0 | 0 | 0 | VCC |
| 3 | 0 | 1 | 0 | 1 | 1 | 0 | 0 | 1 | 0 | VCC | 0 |
| 4 | 0 | 1 | 0 | 1 | 1 | 0 | 1 | 0 | 0 | VCC | VCC |
| 5 | 0 | 1 | 1 | 0 | 0 | 1 | 0 | 1 | VCC | 0 | 0 |
| 6 | 0 | 1 | 1 | 0 | 0 | 1 | 1 | 0 | VCC | 0 | VCC |
| 7 | 0 | 1 | 1 | 0 | 1 | 0 | 0 | 1 | VCC | VCC | 0 |
| 8 | 0 | 1 | 1 | 0 | 1 | 0 | 1 | 0 | VCC | VCC | VCC |
| 9 | 1 | 0 | 0 | 1 | 0 | 1 | 0 | 1 | —VCC | —VCC | —VCC |
| 10 | 1 | 0 | 0 | 1 | 0 | 1 | 1 | 0 | —VCC | —VCC | 0 |
| 11 | 1 | 0 | 0 | 1 | 1 | 0 | 0 | 1 | —VCC | 0 | —VCC |

-continued

|  | Input | | | | | | | Output | | |
|---|---|---|---|---|---|---|---|---|---|---|
|  |  |  |  |  |  |  |  | Phase 1 | Phase 2 | Phase 3 |
| ηH | ηL | 1H | 1L | 2H | 2L | 3H | 3L | voltage | voltage | voltage |
| 12 | 1 | 0 | 0 | 1 | 1 | 0 | 1 | 0 | −VCC | 0 | 0 |
| 13 | 1 | 0 | 1 | 0 | 0 | 1 | 0 | 1 | 0 | −VCC | −VCC |
| 14 | 1 | 0 | 1 | 0 | 0 | 1 | 1 | 0 | 0 | −VCC | 0 |
| 15 | 1 | 0 | 1 | 0 | 1 | 0 | 0 | 1 | 0 | 0 | −VCC |
| 16 | 1 | 0 | 1 | 0 | 1 | 0 | 1 | 0 | 0 | 0 | 0 |

The switching table illustrates the switching states of logic control circuits 2[1]~2[3] and the voltage differences across the magnetic field generating units M1~M3 corresponding to these switching states. The values (1 and 0) of columns 1H, 1L, 2H, 2L, 3H, 3L, ηH, and ηL below the "Input" column in the switching table sequentially indicate the switching states of switches S1H, S1L, S2H, S2L, S3H, S3L, SηH, and SηL. The value "1" means "the switch is on," and the value "0" means "the switch is off." In addition, the symbols (−VCC, VCC, and 0) of columns Phase 1 voltage, Phase 2 voltage, and Phase 3 voltage in the switching table, respectively and sequentially correspond to the voltage states at both ends of the magnetic field generating units M1, M2, and M3.

The logic control circuits 2[1]~2[3] and logic control circuit 2[η] in the present embodiment are ideal switches that do not cause a voltage drop. When the Phase 1 voltage value is VCC, the voltage of the endpoint P1 minus the voltage of the neutral point NP is VCC. When the Phase 2 voltage value is VCC, the voltage of the endpoint P2 minus the voltage of the neutral point NP is VCC. When the Phase 3 voltage value is VCC, the voltage of the endpoint P3 minus the voltage of the neutral point NP is VCC. When the Phase 1 voltage value is −VCC, the voltage of the endpoint P1 minus the voltage of the neutral point NP is −VCC. When the Phase 2 voltage value is −VCC, the voltage of the endpoint P2 minus the voltage of the neutral point NP is −VCC. When the Phase 3 voltage value is −VCC, the voltage of the endpoint P3 minus the voltage of the neutral point NP is −VCC. When the phase 1 voltage value is "0", there is no voltage difference between the endpoint P1 and the neutral point NP. When the Phase 2 voltage value is "0", there is no voltage difference between the endpoint P2 and the neutral point NP. When the phase 3 voltage value is "0", there is no voltage difference between the endpoint P3 and the neutral point NP.

From the 1st to 8th rows, the switch SηH is off, and SηL is on (ηH=0, ηL=1); therefore, Phase 1 voltage, Phase 2 voltage, and Phase 3 voltage are all VCC or 0. Each of the voltage of endpoints P1, P2 and P3 (hereinafter referred to as "endpoints P1~P3") minus the voltage of the neutral point NP is VCC or 0. On the other hand, from the 9th to 16th rows, the switch SηH is on, and SηL is off (ηH=1, ηL=0); therefore, Phase 1 voltage, Phase 2 voltage, and Phase 3 voltage are all −VCC or 0. Each of the voltage of endpoints P1~P3 minus the voltage of the neutral point NP is −VCC or 0.

In the 1st and 8th rows, the switch SηH is off, and SηL is on (ηH=0, ηL=1); therefore, the Phase 1 voltage, Phase 2 voltage and Phase 3 voltage (hereinafter referred to as "Phase 1~3 voltages") are all VCC or 0 in both 1st and 8th rows. In the 8th row, the switches S1H, S2H and S3H (hereinafter referred to as "switches S1H~S3H") are on (1H=1, 2H=1, 3H=1), and switches SL, S2L and S3L (hereinafter referred to as "switches S1L~S3L") are off (1L=0, 2L=0, 3L=0); therefore, the Phase 1~3 voltages are all VCC in the 8th row. Each of the voltage of endpoints P1~P3 minus the voltage of the neutral point NP is VCC. In the 1st row, the switches S1H~S3H are off (1H=0, 2H=0, 3H=0), and switches S1L~S3L are on (1L=1, 2L=1, 3L=1); therefore, the Phase 1~3 voltages are all 0 in the 1st row. Each of the voltage of endpoints P1~P3 minus the voltage of the neutral point NP is 0.

In the 9th and 16th rows, the switch SηH is on, and SηL is off (ηH=1, ηL=0); therefore, the Phase 1~3 voltages are all VCC or 0 in both 9th and 16th rows. In the 9th row, the switches S1H~S3H are off (1H=0, 2H=0, 3H=0), and switches S1L~S3L are on (1L=1, 2 L=1, 3 L=1); therefore, the Phase 1~3 voltages are all −VCC in the 9th row. Each of the voltage of endpoints P1~P3 minus the voltage of the neutral point NP is −VCC. In the 16th row, the switches S1H~S3H are on (1H=1, 2H=1, 3H=1), and switches S1L~S3L are off (1L=0, 2 L=0, 3 L=0); therefore, the Phase 1~3 voltages are all 0 in the 16th row. Each of the voltage of endpoints P1~P3 minus the voltage of the neutral point NP is 0.

In addition, please refer to the 2nd to 7th rows and the 10th to 15th rows data in the switching table. In this embodiment, the switching state of two switches in each of logic control units 2[1]~2[3] can be individually set. For example, but not limited to: the switch S1H of the first logic control unit 2[1] is on, the switch SL of the first logic control unit 2[1] is off, and the switch S2H of the second logic control unit 2[2] is off, the switch S2L of the second logic control unit 2[2] is on. Because the switch combination of each logic control unit does not necessarily have to be the same, the voltage state across each of the magnetic field generating units M1~M3 (i.e. Phase 1~3 voltages) can be separately controlled.

Figure 3:
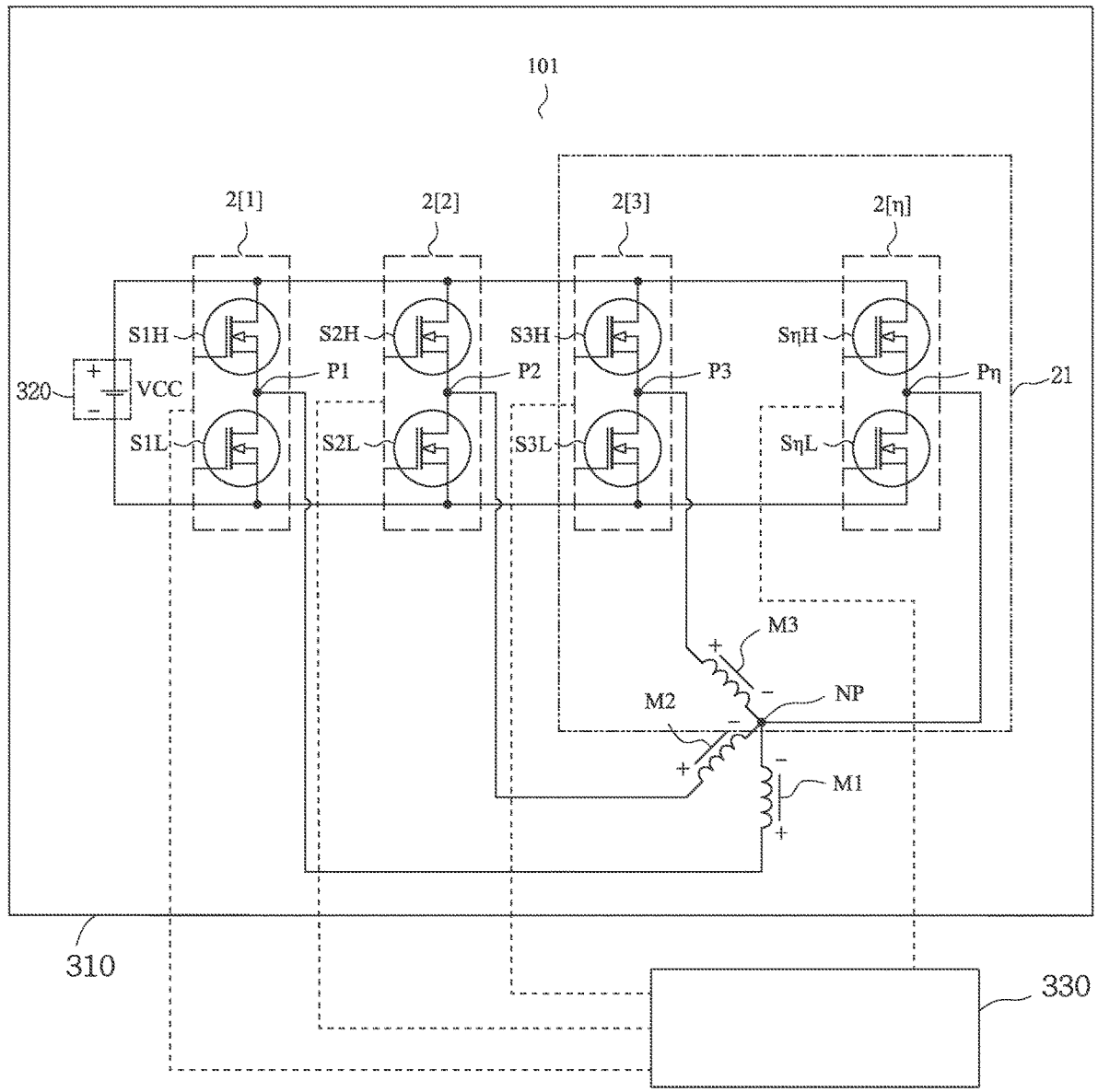
FIG. 3 is a schematic diagram illustrating a MDSVM system in accordance with the preferred embodiments of the present application.

FIG. 3 is a schematic diagram of a multidimensional space vector modulation system 300 (hereinafter referred to as "MDSVM system"), which includes at least one circuit carrier 310, a power supply 320, and a controller 330. The circuit carrier 310 is provided with the MDSVM circuit 100, 101 of any of the foregoing embodiments of FIGS. 1 and 2. For simplicity, the circuit carrier 310 is provided with the MDSVM circuit 101 of FIG. 2 and has the same element reference numbers as in FIG. 2. The power supply 320 is connected to the circuit carrier 310 and coupled to the multidimensional space vector modulation circuit 101, and the controller 330 is connected to the circuit carrier 310 and coupled to the multidimensional space vector modulation circuit 101 to transmit electronic signals to the logic control circuits 2[1], 2[2], 2[3], and 2[η]. The switching states of the switches are controlled, thereby controlling the voltage difference between both ends of each of electronic components M1~M3.

The present disclosure further provides a multidimensional space vector modulation method (hereinafter referred to as "MDSVM method"), including coupling a plurality of half-bridge circuits to each other to form an MDSVM circuit in any of the above-mentioned embodiments that have at least three full-bridge circuits. There is at least one half-bridge circuit not coupled to any electronic component and at least three half-bridge circuits coupled to at least one electronic component. The users can use a controller to send electronic signals to the MDSVM circuit to individually control the switch states of each of the aforesaid switches. Therefore, users can further control the voltage difference between both ends of each electronic component separately and then individually control the strength and direction of current flowing through each electronic component.

In summary, the preferred embodiment includes an extra half-bridge η-logic control circuit not directly coupled to any electronic components is coupled to at least three half-bridge logic control circuits that are coupled to electronic components to form an MDSVM circuit. In the MDSVM circuit, the η-logic control circuit and any other half-bridge logic control circuits that is coupled to electronic components form a full-bridge circuit. Users can individually control the voltage state of each electronic component by the MDSVM circuit of the present disclosure, thereby saving the number of switches used.

What is claimed is:

1. A multidimensional space vector modulation (MDSVM) circuit comprising:
    N electronic components, N is a positive integer not less than 3, and a first end of each of the N electronic components being coupled to each other to form a neutral point, wherein the N electronic components are configured to generate N magnetic fields;
    N+1 logic control circuits connecting with each other in parallel, each of the N+1 logic control circuits having at least two switches coupled to each other in series, wherein the neutral point is directly connected between the at least two switches of one logic control circuit of the N+1 logic control circuits, and a second end of each of the N electronic components is respectively coupled between the at least two switches of other N logic control circuits of the N+1 logic control circuits than the one logic control circuit directly connected with the neutral point, and no electronic component is directly connected between the neutral point and the one logic control circuit; and
    a controller coupled to the multidimensional space vector modulation circuit for transmitting electronic signals to the N+1 logic control circuits to control switching states of the at least two switches of the N+1 logic control circuits, thereby controlling a voltage difference between the first and second ends of the N electronic components,
    wherein strengths and directions of the N magnetic fields generated by the N electronic components are adjustable by the at least two switches of the N+1 logic control circuits, and the MDSVM circuit is configured to supply power to a multi-degree-of-freedom (Multiple DOFs) motor.

2. The multidimensional space vector modulation circuit of claim 1, wherein each of the N+1 logic control circuits is a half-bridge circuit, each of the N logic control circuits and the one logic circuit forms a full-bridge circuit, respectively, and the multidimensional space vector modulation circuit includes at least three full-bridge circuit.

3. The multidimensional space vector modulation circuit of claim 1, wherein each of the N electronic components has at least one coil, and the N electronic components generate a magnetic field when an electric current flows through each coil of the N electronic components.

4. The multidimensional space vector modulation circuit of claim 1, wherein each of the N+1 logic control circuits has an even number of switches.

5. The multidimensional space vector modulation circuit of claim 1, wherein a total number of switches in the multidimensional space vector modulation circuit is 2 N+2.

6. The multidimensional space vector modulation circuit of claim 1, wherein each of the switches has Metal-Oxide-Semiconductor-Field-Effect Transistors (MOSFETs), Insulated Gate Bipolar Transistors (IGBTs), or Bipolar Junction Transistors (BJT).

7. The multidimensional space vector modulation circuit of claim 1, wherein when N is three (N=3), the MDSVM circuit comprises three electronic components and four logic control circuits coupled to each other in parallel, and the electronic components generates magnetic fields that are orthogonal to each other.

8. A multidimensional space vector modulation (MDSVM) system, comprising:
    a circuit carrier including a multidimensional space vector modulation circuit, wherein the circuit carrier comprises:
        N electronic components, N is a positive integer not less than 3, first end of each of the N electronic components being coupled to each other to form a neutral point, wherein the N electronic components are configured to generate N magnetic fields; and
        N+1 logic control circuits connecting with each other in parallel, each of the N+1 logic control circuits having at least two switches coupled to each other in series, wherein the neutral point is directly connected between the at least two switches of one logic control circuit of the N+1 logic control circuits, and a second end of each of the N electronic components is respectively coupled between the at least two switches of other N logic control circuits of the N+1 logic control circuits than the one logic control circuit directly connected with the neutral point, and no electronic component is directly connected between the neutral point and the one logic control circuit;
    a power supply coupled to the circuit carrier; and
    a controller coupled to the multidimensional space vector modulation circuit for transmitting electronic signals to the N+1 logic control circuits to control switching states of the at least two switches of the N+1 logic control circuits, thereby controlling a voltage difference between the first and second ends of the N electronic components,
    wherein strengths and directions of the N magnetic fields generated by the N electronic components are adjustable by the at least two switches of the N+1 logic control circuits, and the MDSVM system is configured to supply power to a multi-degree-of-freedom (Multiple DOFs) motor.

9. The multidimensional space vector modulation system of claim 8, wherein each of the N electronic components has at least one coil, and the N electronic components generate a magnetic field when an electric current flows through the coil of each of the N electronic components.

10. A multidimensional space vector modulation (MDSVM) method comprising:
    coupling N+1 half-bridge circuits of an MDSVM circuit to each other in parallel to form at least three full-bridge circuits, each of the N+1 half-bridge circuits having at least two switches coupled to each other in series, wherein N is an integer not less than 3;
    coupling the N+1 half-bridge circuits to N electronic components to individually control a strength and a direction of a current flowing through each of the N electronic components;
    wherein the N electronic components are configured to generate N magnetic field, each of the N electronic components has a first end and a second end, the first end of each of the N electronic components is coupled together to form a neutral point and the second end of each of the N electronic components is coupled to N half-bridge circuits of the N+1 half-bridge circuits, wherein one half-bridge circuit other than the N half-bridge circuit is directly connected to the neutral and does not directly connect to any of the at least N electronic component; and individually control the strength and the direction of the current flowing through each of the N electronic components so that the N magnetic fields generated by the N electronic components have different strengths and various directions, wherein a controller transmits electronic signals to the N+1 half-bridge circuits to control switching states of the at least two switches of the N+1 half-bridge circuits, thereby controlling a voltage difference between the first and second ends of the N electronic components, and wherein the strengths and directions of the N magnetic fields generated by the N electronic components are adjustable by the at least two switches of the N+1 half-bridge circuits, and the MDSVM circuit is configured to supply power to a multi-degree-of-freedom (Multiple DOFs) motor.

* * * * *